INVENTOR.
DAVID F. SAWYER
BY: MALLINCKRODT & MALLINCKRODT
ATTORNEYS

Dec. 29, 1970  D. F. SAWYER  3,551,128
METHOD AND APPARATUS FOR FORMING NOVEL LIGHTING
ELEMENT COILS OF FLUORESCENT GLASS TUBING
Filed May 15, 1969  3 Sheets-Sheet 2

*INVENTOR.*
DAVID F. SAWYER
BY: *MALLINCKRODT & MALLINCKRODT*

ATTORNEYS

Dec. 29, 1970

D. F. SAWYER 3,551,128

METHOD AND APPARATUS FOR FORMING NOVEL LIGHTING
ELEMENT COILS OF FLUORESCENT GLASS TUBING

Filed May 15, 1969

INVENTOR.
DAVID F. SAWYER
BY: MALLINCKRODT & MALLINCKRODT

ATTORNEYS

United States Patent Office 3,551,128
Patented Dec. 29, 1970

3,551,128
METHOD AND APPARATUS FOR FORMING NOVEL LIGHTING ELEMENT COILS OF FLUORESCENT GLASS TUBING
David F. Sawyer, 3532 Riverdale Road, Ogden, Utah 84403
Continuation-in-part of application Ser. No. 558,504, June 17, 1966. This application May 15, 1969, Ser. No. 839,759
Int. Cl. C03b 23/06
U.S. Cl. 65—109                                   4 Claims

ABSTRACT OF THE DISCLOSURE

A method of and apparatus for forming helical, fluorescent, lighting coils from internally-coated, fluorescent, glass tubing. The method involves, and the apparatus includes means for, inserting an end of a length of rectiliner fluorescent tubing into a closely-dimensioned receiving bore that extends along the longitudinal axis of a helically-formed mandrel, and heating, bending, and winding onto the mandrel the externally projecting portion of the tubing. For the winding operation, the tubing being fed to the mandrel is heated at opposite sides thereof, such heating extending over a longer length of the side of the tubing that forms the outer curvature when wound on the mandrel than of the side of the tubing that forms the inner curvature. Ribbon burners of appropriate length and mounted for movement into and away from operative positions are provided as part of the apparatus.

---

Figure 1:
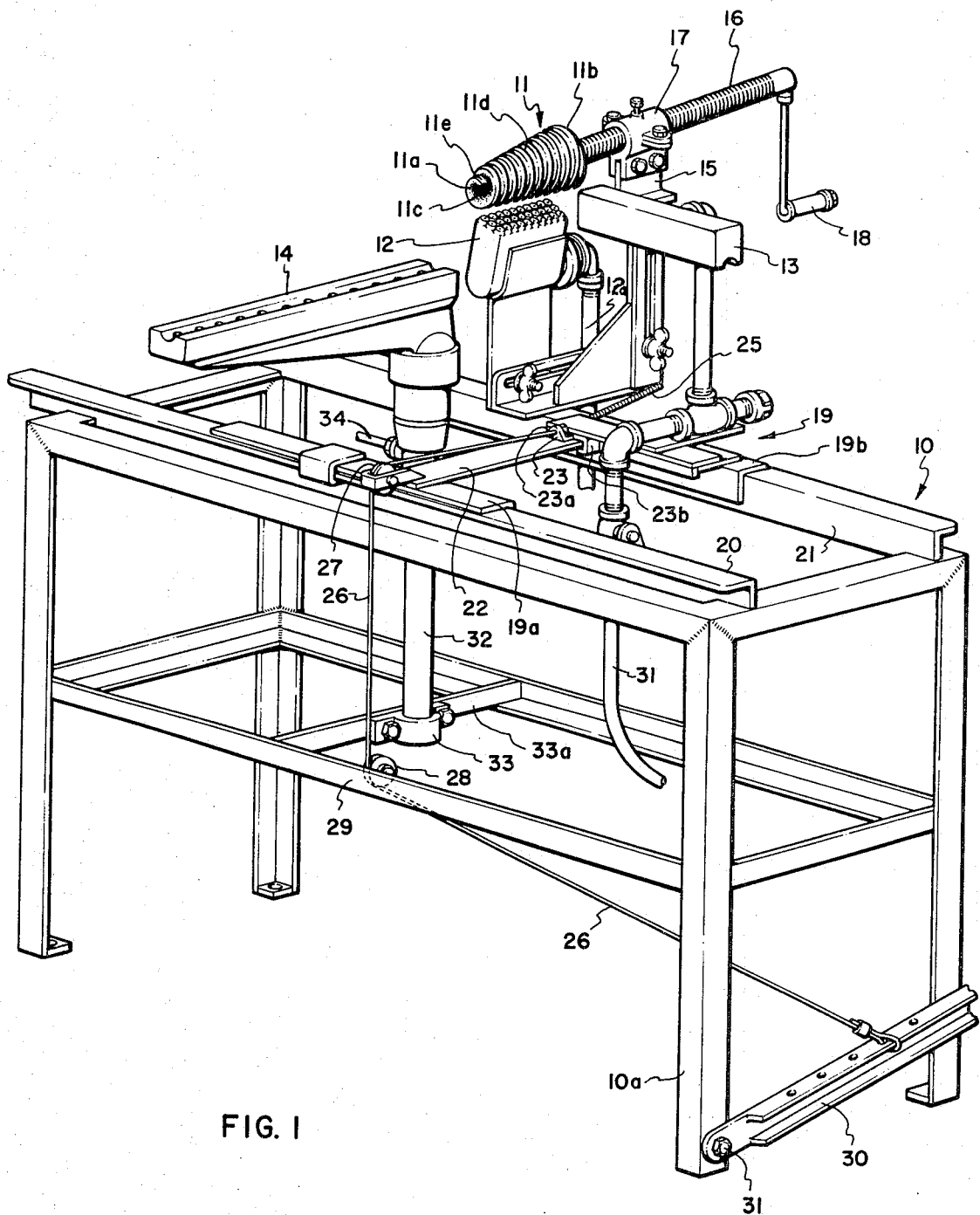

The present application is a continuation-in-part of my copending application Ser. No. 558,504, filed June 17, 1966, now abandoned.

THE INVENTION

This invention relates to an improved method of forming lighting elements, particularly helically coiled, glass, lighting elements of the general type disclosed and claimed in my U.S. Pat. No. 2,205,672, issued June 25, 1940, and aso relates to improved apparatus for producing such lighting elements.

In producing lighting elements of the type disclosed in my aforementioned Pat. No. 2,205,672, the coiled portion was formed on a mandrel under which a heat source was positioned as shown in my U.S. Pat. No. 2,239,005 issued Apr. 22, 1941. Following the forming, the coiled portion was removed from the mandrel, and an electrode leg portion of tubing material was passed through the coil and welded, i.e. fused, to an end of the coil provided for the purpose.

Because of the uneven heating of the glass tube that resulted from using a single heating element directly below the mandrel, the tube being coiled frequently broke. A skilled craftsman then had to attempt to weld the tubing sections together, or the entire coil had to be discarded. Since even a trained and skilled craftsman could not always succeed in welding tubing sections together, many coils had to be discarded, either because of a break in the tubing as they were formed on the mandrel, or because the craftsman was unable to complete welds of straight electrode leg portions onto the ends of the coil portions of the lighting elements.

Because of the many welds, the resulting waste, and the need for skilled craftsmen, the cost of producing this type of lighting element was higher than could be justified and production had to be stopped.

In addition, welding of the tube and heating of the underside of the tubing resulted in cracks developing in the fluorescent coating on the inside of the tube and a resultant loss of efficiency of the completed lighting element. These cracks ultimately resulted in an unattractive, darkened appearance of the lighting element.

In the making of the present invention it was an object to provide a method and apparatus enabling the lighting elements to be formed as an integral unit, without the necessity of welding on an electrode leg portion and without the high percentage of discards resulting from broken coils heretofore obtained; and to therefore produce the lighting elements more economically than in the past.

It was also an object to produce lighting elements of the type concerned, without damaging the interior fluorescent coating.

In accomplishing the first of these objects, I now employ a special helically grooved mandrel having a bore hole extending along the longitudinal axis and from an end face thereof and dimensioned to closely receive an end of the tubing to be coiled in the mandrel. The helical groove terminates as a notch in the face of the mandrel and provides a smooth transition between bore hole and groove. The mandrel is mounted to be moved axially while being rotated.

In accomplishing the second object, the tubing is wound onto the mandrel, which is preferably heated, after passing between ribbon burners at bottom and top sides of the tubing that preferably differ in length so the tubing will be disproportionately heated on opposite sides, the heating extending over a longer distance at the outer side of the tubing as coiled on the mandrel than at the inner side. A separate burner is normally provided beneath the mandrel to insure that the portion of the spiral groove receiving the tubing is heated.

Both ribbon burners are preferably movable into and out of position laterally of the mandrel, where they serve to heat the tubing being fed to the mandrel. The lower ribbon burner is conveniently pivoted so as to swing from a position in line with the bore hole in the mandrel, and the upper burner is preferably moved into and out of operative position laterally of the mandrel by a foot control that leaves the operator's hands free for manipulation of the tubing, and, if necessary, for operation of the mandrel.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

Figure 3:
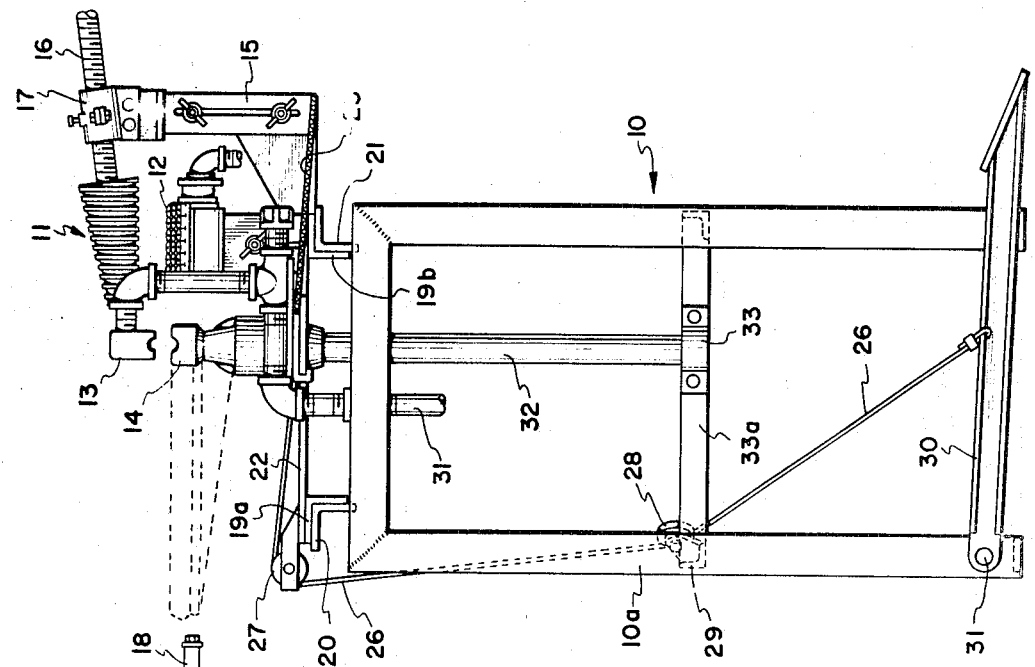
Figure 2:
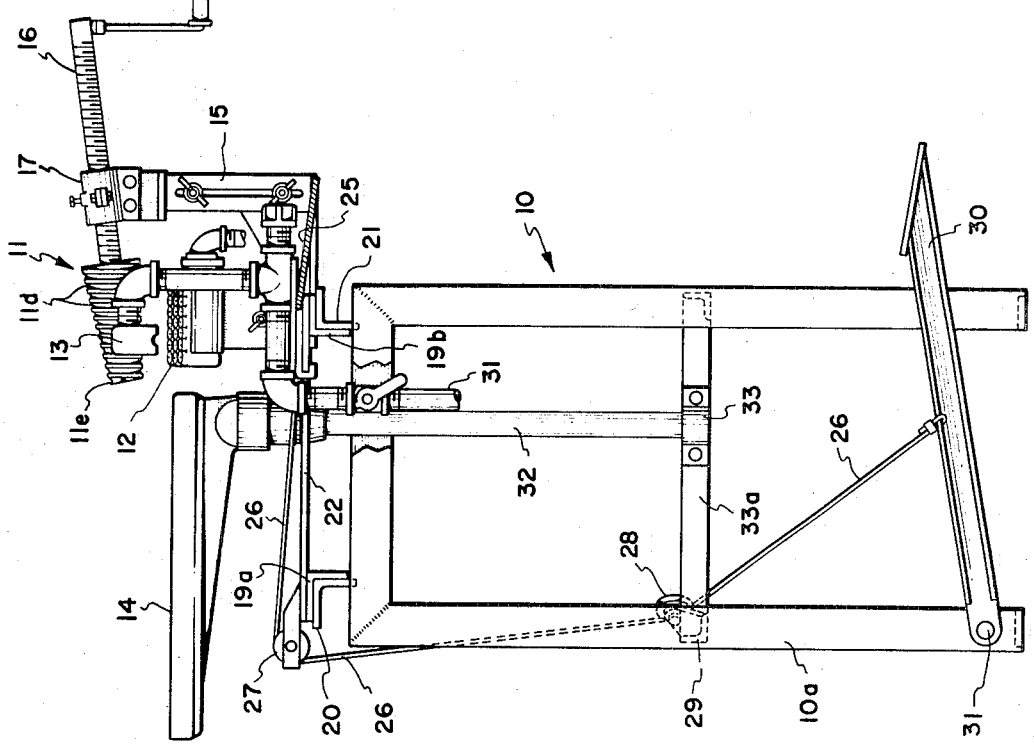
Figure 4:
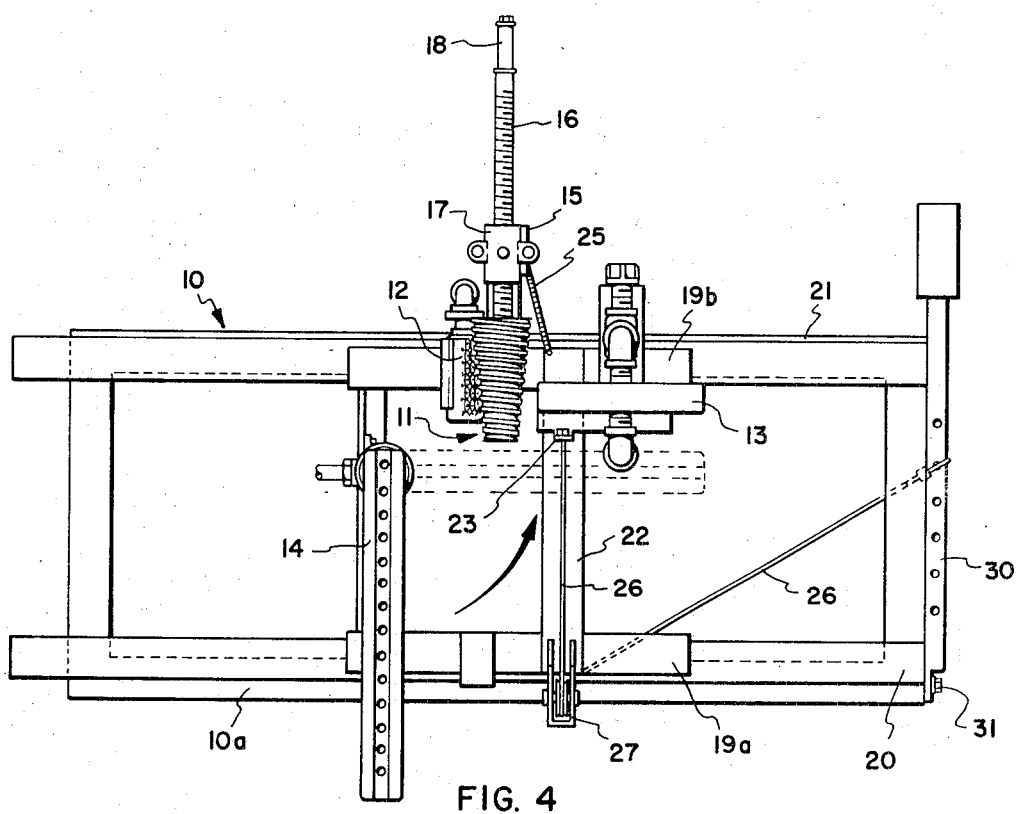
Figure 5:
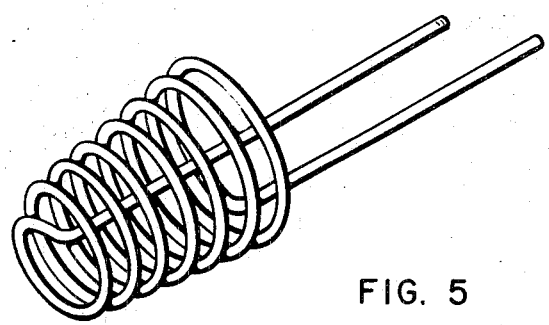

In the drawings:

FIG. 1 is a perspective view of the apparatus of the invention;

FIG. 2, a side elevation view, with the fixed ribbon burner positioned in front of the mandrel and the movable ribbon burner in its back, out-of-the-way position;

FIG. 3, a view like FIG. 2, with the pivoted ribbon burner and the movable ribbon burner in position to have tubing passed between them;

FIG. 4, a top plan view with the movable ribbon burner in its back position and the pivoted burner in front of the mandrel, but with its other position shown in dotted lines, the mandrel, movable ribbon burner, and associated structure being shown arbitrarily displaced to the right from their normal positions wherein the mandrel is aligned with the front position of the pivoted burner; and FIG. 5, a perspective view of a completed coil of fluorescent-treated glass tubing ready for additional steps necessary to produce a final lighting element.

Referring now to the drawings:

In the illustrated preferred embodiment, the apparatus of the invention includes a support frame, shown generally at 10, on which is mounted a mandrel 11, fixed burner 12 beneath the mandrel, a short movable ribbon burner 13 mounted to be moved into position overlying tubing fed onto the mandrel and a longer pivoted ribbon burner 14 adapted to be moved from a position in front of the mandrel to a position at the side of the mandrel and beneath the small movable burner.

Although it is preferred to employ ribbon burners of unequal lengths, as indicated, it is possible to employ burners of equal lengths so long as the extent of heating along the length of the tubing is sufficient to take care of the longer outer curvature.

As illustrated, mandrel 11 is of generally conical configuration, with its taper from the front end face 11a backwardly in the direction of a mandrel support standard 15 fixed to frame 10. The large rear end face 11b of the mandrel has a threaded shaft 16 protruding centrally therefrom, which is threaded through a collar 17 carried by the support standard 15.

A crank handle 18 is affixed to the other end of shaft 16 and provides a means for turning the shaft to move it axially through collar 17. A motor and reduction gearing (not shown) could as well be used to rotate shaft 16 and for larger and continuous manufacturing operations such an arrangement, including a remote motor control for operation by the operator, is preferred. In any event, rotation of shaft 16 under control of the operator will move the shaft and the mandrel carried thereby axially as they are rotated.

The small end face 11a of mandrel 11 has a tubing-receiving, central bore hole 11c formed therein and extending backwardly along the axis of the mandrel. The bore hole is closely dimensioned relative to the tubing to receive and hold one end of the tubing length to be formed into a coil element for a lighting fixture.

The exterior of the mandrel has a continuous helical, in this instance spiral, groove 11d formed thereon, and it is an important feature of the invention that a transition groove or notch 11e be formed in the end face 11a of the mandrel by termination of such exterior groove 11d therein to smoothly interconnect the bore hole 11c and the spiral groove 11d. The pitch of spiral groove 11d conforms to the pitch of the thread on shaft 16 so that tubing will be turned onto the mandrel without requiring displacement of the tubing laterally.

The mouth of bore hole 11c is flared outwardly and is smooth to prevent damage to the tubing.

Burner 12 is fixed to a sliding frame 19 and is positioned substantially beneath the entire mandrel 11 when shaft 15 has been rotated to move the mandrel to its extreme position closest to support standard 15. A flexible conduit 12a supplies the necessary fuel gas to burner 12.

Sliding frame 19 includes angle members 19a and 19b that fit over front and rear rails 20 and 21, respectively, of support frame 10. Sliding frame 19 also includes a cross member 22 on which is mounted a slide 23 to which is attached the movable ribbon burner 13. Slide 23 has depending guide flanges 23a and 23b that hold the slide on cross member 22. The cross member is secured between the front and rear rails 20 and 21 of sliding frame 19 and a spring 25, anchored at one of its ends to support standard 15, which is also carried by sliding frame 19, and at its other end to the slide 23 biases the slide and burner carried thereby to position the burner against member 19b, see FIG. 4, and at the rear of mandrel 11 when the mandrel is in its extreme position closest to the standard 15.

A cable 26 is affixed to slide 23 and passes from there over a pulley 27 mounted on sleeve member 19b at the end of cross member 22, down to and around a pulley 28 mounted on a lower brace 29 of the frame 10, and to a foot-operated lever 30 pivotally connected at 31 to the lower end of a leg 10a of the frame 10. The cable is connected intermediate the length of lever 30 such that pivoting of the lever will pull on cable 26 and move slide 23.

A flexible conduit 31, insures continuous supply of fuel gas from a source (not shown) to the movable burner 13 carried by slide 23, even as the slide and burner are moved.

To move the slide it is only necessary for an operator to step on the free end of lever 30. This pivots the lever and pulls on cable 26 to move the slide in opposition to spring 25. When the lever is released, spring 25 will automatically move the slide and burner carried thereby to their biased positions.

Pivoted ribbon burner 14 is preferably longer than the movable ribbon burner 13, for the reason previously indicated. It is mounted on the upper end of a standpipe 32 that is fixed by brackets 33 and cross member 33a to frame 10. Fuel gas is supplied through the upper portion of pipe 32 from a flexible hose 34, FIG. 1, and flows to burner 14. Such burner is pivotable between a first position, wherein its burner surface is just below and continued outwardly from the front face of the mandrel, and a second position at the side of the mandrel where tubing turned onto the mandrel will be passed between the larger pivoted ribbon burner and the smaller movable ribbon burner.

In operation, in accordance with the method of the invention, one end portion of a length of internally coated, fluorescent, glass tubing to be bent is inserted into the receiving bore hole 11c so that such tubing projects outwardly therefrom over the pivoted ribbon burner 14 while such burner is positioned in front of the mandrel as in FIG. 1. The projecting portion of the tubing is then turned laterally on the heated portion at the face of the mandrel and is fed into the groove or notch 11e and on into and along spiral groove 11d as the mandrel rotates clockwise.

As soon as the tubing is turned laterally, ribbon burner 14 is pivoted to the dotted line position shown in FIG. 4 beneath the turned portion of the tubing. The operator then steps on lever 30 to pull on cable 26 and to slide movable ribbon burner 13 until it overlies the pivoted burner and the tubing. The larger pivoted burner heats a larger area on the bottom of the tube during winding of the tube on the mandrel than does the smaller movable burner, and this disproportionate heating gives the opposite sides of the tubing, the top and the bottom in this instance, the flexibility needed to permit bending without breaking the tube or cracking the fluorescent coating on the inside of the tube.

Fixed burner 12 maintains the mandrel in heated condition to guard against too rapid cooling and resultant cracking of the tubing or its internal coating.

Because of the relationship of the thread on shaft 16 and the spiral goove 11d on the mandrel, the mandrel is advanced axially at the same rate as the tubing is wound thereonto thereby permitting continuously feeding of the tubing between the pivoted burner 14 and the movable burner 13. The desired flexibility of the tubing can be obtained and maintained by selectively moving the ribbon burner 13 over or away from the tubing.

Once the length of tubing has been wound onto the mandrel as far as desired, the remaining length is bent parallel to the end portion previously inserted into the mandrel and the two end portions of the tubing are cut to appropriate length for receiving electrodes.

When the coil of glass tubing, as shown in FIG. 5, has been thus completed, the lever 30 is released and the movable burner moved out of the way by the action of spring 25. Pivoted burner 14 is moved to its position extending forwardly from the end of the mandrel, and slide 23 is moved to one end of frame 10 out of the way of the pivoted burner. The completed coil of glass tubing is then removed from the mandrel, and crank 18 is turned in the opposite direction to retract the mandrel into its original position relative to the pivoted burner, ready for another operation. Attachment of electrodes (not shown) to the free ends of the two legs 31a and 31b of the coiled portion 31 completes the lighting element.

It should be noted that, whereas the leg extending from the forward end of the coil backwardly through the center of the coil, here the leg 31a, FIG. 5, had to be welded onto the forward terminus of the coil in the instances disclosed by my aforementioned prior patents, which was an expensive operation, such leg is now formed integrally with the coil by reason of the present mandrel with its axial, tubing-receiving bore 11c.

Although the mandrel has here been described and illustrated as being of generally conical configuration, it should be apparent that it could as well be cylindrical or of other varied configurations.

Whereas this invention is here described and illustrated with respect to a certain form thereof, it is to be understood that many variations are possible.

I claim:

1. Apparatus for forming fluorescent lighting element coils from internally-coated, fluorescent tubing, comprising:

a support frame;
   a mandrel;
   means mounting said mandrel for simultaneous rotation and axial travel with respect to said frame;
   said mandrel having a tubing-receiving central bore hole extending through one face thereof and axially into the mandrel;
   a helical groove formed on the outer surface of the mandrel and terminating in said one face thereof in a notch that provides for smoothly bending a projecting length of received tubing and winding on said mandrel;
   a pivoted ribbon burner adapted to be moved from a position beneath and extending outwardly from the end of the mandrel having the tubing-receiving bore therethrough into a position beneath and extending laterally of the mandrel; and
   a movable ribbon burner adapted to be moved between an out of the way position and a position wherein its burner face is positioned opposite the burner face of the pivoted burner when it extends laterally from the mandrel, said pivoted burner being longer than said movable burner.

2. Apparatus according to claim 1, wherein the pivoted ribbon burner is longer than the movable burner; and foot operated means are provided to move the movable ribbon burner.

3. Apparatus according to claim 1, wherein the mandrel, and the burners are mounted on a frame slidable on the support frame.

4. A method of forming fluorescent lighting element coils from internally-coated, fluorescent tubing comprising:

inserting an end of a rectilinear length of said tubing into a receiving bore that extends along the longitudinal axis of a helically-formed mandrel from one end thereof, the remainder of the tubing projecting exteriorly from said end of the mandrel;
   heating said tubing for bending;
   turning the exteriorly projecting portion of said tubing substantially normal to the longitudinal axis of the mandrel, so that it bends and assumes a position tangential to the helically-formed surface of said mandrel for winding onto said surface as the mandrel rotates;
   heating and rotating the mandrel;
   heating the tubing along a length thereof immediately adjacent to the mandrel during feeding of the tubing to the mandrel to make the tubing flexible enough to be wound onto the mandrel, said heating being carried out by applying heat to and along diametrically opposite sides of said tubing, said heat being applied over a greater length of the side of the tubing that forms the longer outer curvature when such tubing is wound on the mandrel than of the side that forms the shorter inner curvature;
   feeding heated portions of the tubing to the mandrel until a desired coil length is formed;
   and turning the remaining length of the tubing to bend it at a heated portion thereof so that it extends substantially parallel to the longitudinal axis of the mandrel and to the end of the tubing that was inserted in the bore of the mandrel.

References Cited

UNITED STATES PATENTS

| 2,239,055 | 4/1941 | Sawyer | 65—292 |
| 3,186,820 | 6/1965 | Adkins | 65—271 |

ARTHUR D. KELLOGG, Primary Examiner

U.S. Cl. X.R.

65—271, 274, 279, 281, 292